Feb. 20, 1951 E. DE SELGAS Y MARIN 2,542,486
SWITCHING MEANS FOR CONNECTING ELECTRICAL STRUCTURES
WHICH CONTAIN ELEMENTS IN SHUNT
Filed Dec. 10, 1945 2 Sheets-Sheet 1
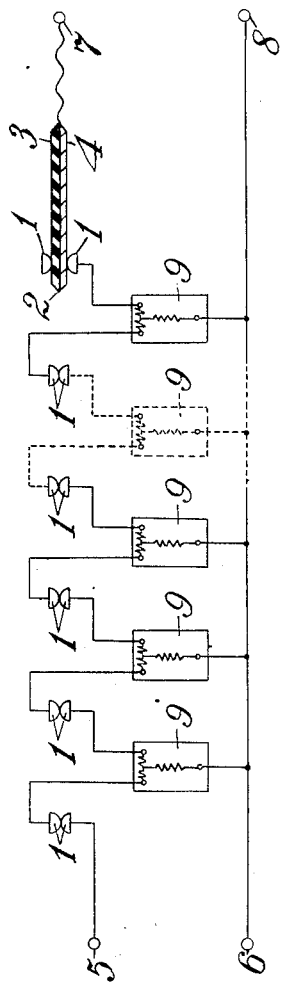
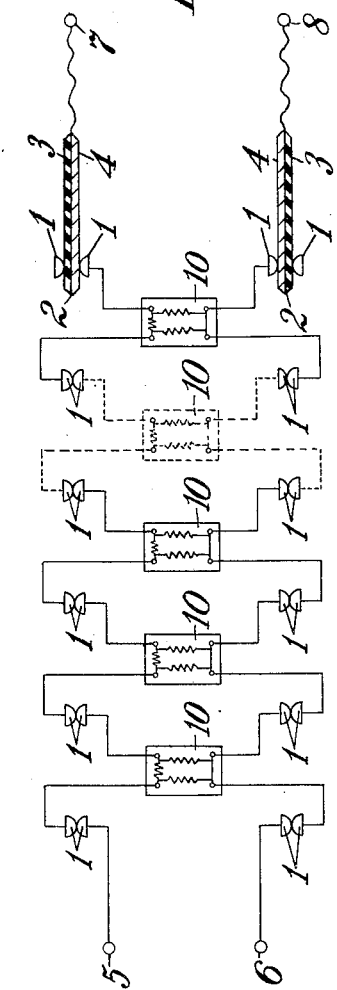
Inventor
E. de Selgas y Marin Feb. 20, 1951 E. DE SELGAS Y MARIN 2,542,486
SWITCHING MEANS FOR CONNECTING ELECTRICAL STRUCTURES
WHICH CONTAIN ELEMENTS IN SHUNT
Filed Dec. 10, 1945 2 Sheets-Sheet 2

Inventor
E. de Selgas y Marin
By Glascock Downing & Seeble
Attys

Patented Feb. 20, 1951

2,542,486

UNITED STATES PATENT OFFICE 2,542,486

SWITCHING MEANS FOR CONNECTING ELECTRICAL STRUCTURES WHICH CONTAIN ELEMENTS IN SHUNT

Ezequiel de Selgas y Marin, Madrid, Spain

Application December 10, 1945, Serial No. 634,039
In Spain January 20, 1945

2 Claims. (Cl. 178—44)

Tapping devices at present in use for inserting into an electric circuit elements which modify its characteristics are extremely simple as long as these elements have to be inserted in series with the general circuit, but they involve great complications as soon as all the said elements have to be inserted in shunt, or some in series and the others in shunt.

This is the case, for example, with a succession of impedance attenuators and correctors constituted by a chain of links, formed in their turn by resistances or impedances in series and shunt, termed "T," "Pi," or "Gamma" links, etc. and referred to in the appended claims by the general expression "electric links."

The construction at present usual for variable attenuators of this type requires the use of at least two or three contact bars and the construction of a large number of different elements which have to be accurately tested and the values of which may vary between wide limits. For these two reasons difficulties are created and the cost of construction is increased.

These drawbacks are avoided according to the present invention by the provision of an arrangement for electrically connecting the links of an attenuator, which arrangement is particularly applicable to those links which comprise elements in shunt, thus having the following advantages: it permits the successive introduction of each new element, those previously introduced remaining in the circuit and the others remaining out of circuit; the number of contact bars is reduced to a minimum; all the links that enter the circuit may be identical with one another, and there is no need to interrupt the said circuit at any time during the connecting operation.

Various embodiments of the invention are diagrammatically illustrated in the accompanying drawings, in which:

Figure 1 shows an arrangement of links or sections with three terminals in an unbalanced network, with a pole common to them all;

Figure 2 shows the arrangement in the case of links with four terminals to obtain balanced lines;

Figure 3 showing the mechanical part only, and Figure 4 showing attenuators also.

Figure 3:
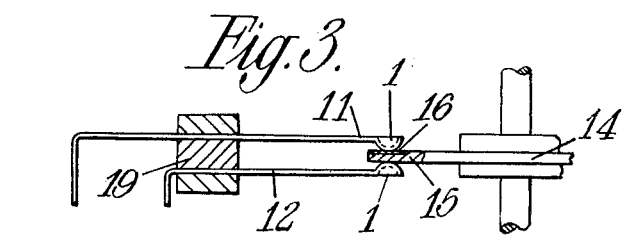
Figures 3 and 4 show in part sectional elevation and in part sectional plan respectively an example of an industrial arrangement corresponding to Figure 1 but with the contacts arranged in a circle.

The apparatus shown diagrammatically in the accompanying drawings is composed of a series of pairs of fixed contacts 1, normally closed, but open during the passage of the moving bar 2, of which the face 3 is of insulating and the face 4 of conducting material.

If 5 and 6 represent the input terminals of the apparatus and 7 and 8 the output terminals, all the links 9 or 10 situated to the left of the position of the moving bar 2 will remain in the circuit and all those on the right will remain out of the circuit.

If the length of the moving bar is such that two pairs of consecutive contacts can be held open, the passage from the one to the other will be carried out without it being necessary to interrupt the general circuit.

Figure 5:
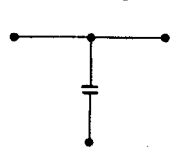
Figures 5, 6, 7, 8, 9 and 10 show examples of the types of circuit being switched.
Figure 7:
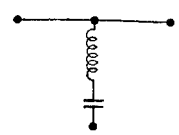

When the links are bipolar, as in Figures 5 and 7, for instance when they are constituted by capacities only, as in Figure 5, the two top terminals of each link will be directly connected with one another and with one of the condenser coatings; the rest of the arrangement is not altered.

Figure 1 shows the arrangement of links with three terminals and with a pole common to them all. The links 9 here shown are of the T network form constituted by three impedances with the ends of the horizontal top of the T connected to the two top terminals of the link and the lower end of the T connected to the third lower terminal of the link.

Figure 2 shows the arrangement in the case of links with four terminals to obtain balanced lines. In this case the links 10 are of the 0 network type with three impedances connected between the four terminals of the link.

In Figures 3 and 4, 11 and 12 are contact arms terminating in the hemispherical contacts 1, 1; the two contacts of each pair normally being in contact with one another. 14 is a rotatable member, which constitutes a moving brush equivalent to the moving bar 2 in Figure 1. 15 is the metallic under surface of the brush 14, and corresponds to the conducting part 4 of the moving bar 2, which establishes contact between the terminals 1 of two successive contact arms 12, while 16 is the insulating upper face of the brush 14, which corresponds to the part 3 in Figure 1, and insulates the terminals 1 from one another when the brush 14 passes between them. 17, 17 are attenuators, here shown as consisting each of three resistances in T-formation, like those in Figure 1. It will be evident that the attenuators behind the brush 14 are disconnected from the circuit. In other cases different electrical structures may be substituted for the attenuators 17. 18 is the common output line of the attenuators, equivalent to the line connecting the terminals 6 and 8 of Figure 1. 19 is an insulating support for the contact arms 11 and 12.

Figure 4:
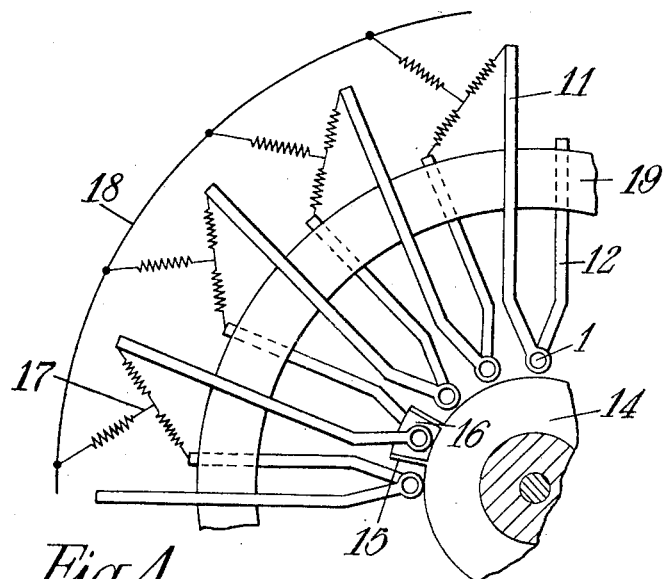

In an analogous industrial arrangement with four-pole links 10 corresponding to the circuit diagram of Figure 2, but with the contacts arranged in a circle, two mechanical systems, similar to the one shown in Figures 3 and 4 would be provided, the terminals being connected to both as indicated in Figure 2, since they would not have the common line 18.

Figure 6:
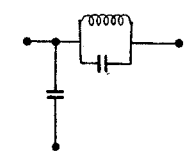
Figure 8:
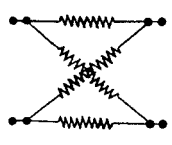
Figure 9:
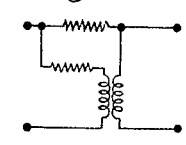
Figure 10:
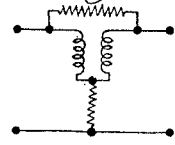

The circuits shown in Figures 5, 6 and 7 may be inserted in the network shown in Figure 1, or that shown in Figures 3 and 4; and the circuits shown in Figures 8, 9 and 10 may be inserted in the network shown in Figure 2.

Among the numerous advantages of this system over those so far known, are the following:

(1) The construction of calibrated variable attenuators can be carried out by introducing successively, into the electric circuit, identical links, which greatly facilitates both their mass production and the standardisation of the spare parts as well as the replacement of any damaged element.

(2) Attenuators can be produced in which the total value of attenuation is very high without the individual value of each resistance being either too high or too low.

(3) A thorough technical study of the various electrical attenuators provided with identical links has rendered it possible to calculate and test in each case the influence of the error in the values of the elements on the total characteristics of the apparatus. The impedance of this type of circuit should be constant, and should not be affected by the number of links thrown into the circuit, if the values of the individual links are correct. From technical calculations, and from various tests, data have been obtained proving that errors in the values of the individual links are not cumulative, and that the resultant error in the total circuit is always below the tolerance values allowed in practice. With this arrangement, therefore, the required attenuation can be applied with great accuracy by varying the number of links in the circuit.

(4) At the moment of passing from one contact to the next, the circuit is not interrupted, the iterative impedance varies slightly, and the attenuation passes through an intermediate value, so that the variation of the attenuation is entirely progressive.

(5) Besides lattice attenuators, associated with mechanical operating devices, the invention may be applied to many other electrical arrangements among which are the following: (a) Decades for capacity boxes; (b) variable elements formed by the successive introduction in shunt of any kind of two-pole electrical devices; (c) variable correctors; (d) variable equalisers; (e) lines with variable time constants; (f) electric filters with variable characteristics; (g) lines in "Gamma" consisting solely of links with two elements.

The contacts may be arranged in a straight line, as in Figures 1 and 2, in a circle as in Figures 3 and 4, or helically etc. as may be most convenient in each case. Several discs may also be mounted on the same spindle, provided with contacts, in order to obtain all kinds of combinations, such as balanced arrangements, multiple lines etc.

I claim:

1. For connection between two input and two output terminals a four terminal circuit comprising a series of "electric links" connected in shunt with one another by an electrical interconnection of one end of all the links between one of the input and an output terminals and an electrical interconnection of the other end of all the links between the other input and output terminal and pairs of separable switch contacts between each two successive links in at least one of the said interconnections, in combination with a movable switching member which has a face made of an electrically conducting material and a face made of an insulating material and is capable of being shifted along the said separable contacts and of being inserted in between the latter, the electrically conducting face of the switching member being permanently connected to one of the terminals, whereby the introduction of the said movable switching member in between any pair of separable contacts will disconnect from the circuit all the links on the one side of that pair and insert into it the links lying on the other side thereof.

2. For connection between two input terminals and two output terminals an electric circuit in combination with a movable switching member as claimed in claim 1 in which the successive pairs of separable switch contacts are located at an equal distance from each other and the length of the movable switching member in the direction of its motion is at least equal to the said distance between successive pairs of switching contacts.

EZEQUIEL DE SELGAS Y MARIN.

REFERENCES CITED

The following references are of record in the file of this patent:

UNITED STATES PATENTS

| Number | Name | Date |
|---|---|---|
| 483,235 | McMunn | Sept. 27, 1892 |
| 1,406,996 | Morrill | Feb. 21, 1922 |